United States Patent
Condoluci et al.

(10) Patent No.: US 11,350,316 B2
(45) Date of Patent: May 31, 2022

(54) PROCEDURE FOR DYNAMIC SERVICE NEGOTIATION

(71) Applicant: Telefonaktiebolaget LM Ericsson (publ), Stockholm (SE)

(72) Inventors: Massimo Condoluci, Sollentuna (SE); Bastian Cellarius, Aachen (DE); Yunxi Li, Järfälla (SE); Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/978,014

(22) PCT Filed: Mar. 5, 2019

(86) PCT No.: PCT/EP2019/055356
§ 371 (c)(1),
(2) Date: Sep. 3, 2020

(87) PCT Pub. No.: WO2019/170624
PCT Pub. Date: Sep. 12, 2019

(65) Prior Publication Data
US 2020/0413294 A1 Dec. 31, 2020

Related U.S. Application Data

(60) Provisional application No. 62/638,543, filed on Mar. 5, 2018.

(51) Int. Cl.
*H04W 28/24* (2009.01)
*H04L 47/2408* (2022.01)
*H04W 28/02* (2009.01)

(52) U.S. Cl.
CPC ......... *H04W 28/24* (2013.01); *H04L 47/2408* (2013.01); *H04W 28/0268* (2013.01)

(58) Field of Classification Search
CPC ..... H04W 28/16; H04W 28/18; H04W 28/20; H04W 28/22; H04W 28/24; H04W 28/26;
(Continued)

(56) References Cited

U.S. PATENT DOCUMENTS 6,097,942 A * 8/2000 Laiho ...................... H04W 4/08
455/414.1
6,160,818 A * 12/2000 Berger ................ H04L 12/5602
370/230
(Continued)

OTHER PUBLICATIONS

International Search Report dated Jul. 17, 2019 for International Application No. PCT/EP2019/055356 filed on Mar. 5, 2019, consisting of 16-pages.
(Continued)

*Primary Examiner* — Kevin D Mew
(74) *Attorney, Agent, or Firm* — Christopher & Weisberg, P.A.

(57) ABSTRACT

A method by a first function implemented on a first network node is provided for dynamic service negotiation. The method includes transmitting a service description to a second function to enable optimized delivery of a service based on the service description by the second function. The service description includes information associated with one or more delivery requirements for the service.

20 Claims, 11 Drawing Sheets

(58) Field of Classification Search
CPC ............. H04W 28/02; H04W 28/0226; H04W 28/0231; H04W 28/0236; H04W 28/0268; H04L 47/10; H04L 47/24; H04L 47/2408
See application file for complete search history.

(56) References Cited

U.S. PATENT DOCUMENTS

| | | | | |
|---|---|---|---|---|
| 6,947,754 B2* | 9/2005 | Ogasawara | ............ | H04W 64/00 455/456.3 |
| 7,802,292 B2* | 9/2010 | Shaw | ...................... | H04L 63/08 726/4 |
| 7,970,648 B2* | 6/2011 | Gailey | ............... | G06Q 30/0277 705/14.49 |
| 8,320,331 B2* | 11/2012 | Vikberg | .............. | H04W 64/003 370/331 |
| 10,129,079 B2* | 11/2018 | Olsson | ................ | H04L 41/0803 |
| 10,674,225 B2* | 6/2020 | Long | ........................ | H04L 29/06 |
| 2001/0014911 A1* | 8/2001 | Doi | .......................... | H04W 4/02 709/221 |
| 2008/0020775 A1* | 1/2008 | Willars | ............... | H04L 47/2408 455/445 |
| 2010/0064373 A1* | 3/2010 | Cai | ....................... | H04W 12/02 726/26 |
| 2010/0291872 A1* | 11/2010 | Laroia | ................... | H04W 72/12 455/41.2 |
| 2012/0254349 A1* | 10/2012 | Quigley | ................. | H04L 67/20 709/217 |
| 2014/0287730 A1 | 9/2014 | Masuda et al. | | |
| 2015/0195858 A1* | 7/2015 | Jin | ..................... | H04W 28/0268 370/230 |
| 2016/0014795 A1* | 1/2016 | Yonehara | .............. | H04W 48/18 370/329 |
| 2016/0095034 A1* | 3/2016 | Hampel | ............ | H04W 36/0058 370/331 |
| 2016/0150520 A1* | 5/2016 | Fodor | .................... | H04L 47/745 455/426.1 |
| 2016/0157134 A1* | 6/2016 | Kordianowski | ........ | H04W 4/08 455/518 |
| 2016/0249372 A1* | 8/2016 | Paredes Cabrera | ... | H04W 76/18 |
| 2017/0177620 A1* | 6/2017 | Zhang | ..................... | G06F 16/29 |

OTHER PUBLICATIONS

3GPP TS 23.501 V15.0.0; 3rd Generation Partnership Project; Technical Specification Group Services and System Aspects; System Architecture for the 5G System; Stage 2 (Release 15); Dec. 22, 2017; pp. 1-181; Sophia-Antipolis Valbonne, France; consisting of 181-pages.

3GPP TS 23.785 V14.0.0; 3rd Generation Partnership Project; Technical Specification Group Services and System Aspects; Study on Architecture Enhancements for LTE Support of V2X Services (Release 14); Sep. 26, 2016 pp. 1-52; Sophia-Antipolis Valbonne, France; consisting of 52-pages.

EPO Communication dated Oct. 13, 2021 for Patent Application No. 19709439.4, consisting of 5-pages.

\* cited by examiner

PROCEDURE FOR DYNAMIC SERVICE NEGOTIATION

CROSS-REFERENCE TO RELATED APPLICATIONS

This application is a Submission Under 35 U.S.C. § 371 for U.S. National Stage Patent Application of International Application No.: PCT/EP2019/055356, filed March 5, 2019 entitled " PROCEDURE FOR DYNAMIC SERVICE NEGOTIATION," which claims priority to U. S. Provisional Application No.: 62/638,543, filed March 5, 2018, the entireties of both of which are incorporated herein by reference.

TECHNICAL FIELD

Certain embodiments of the present disclosure relate, in general, to wireless communications and more particularly to dynamic service negotiation.

BACKGROUND

Wireless Networks typically differentiate different types of traffic by assigning appropriate Quality of Service (QoS) parameters to different services (e.g., File Transfer Protocol (FTP), Voice over Internet Protocol (VoIP), . . . ). Each QoS class is typically associated to network Key Performance Indicators (KPIs) in terms of latency, throughput, relative priority, reliability, etc. In 5G/NR, the concept of QoS is managed and enforced end-to-end (e2e) using QoS flows, while in 4G/LTE, it is handled using EPS bearers. QoS parameters are then configured per flow/bearer.

The traffic of certain network services might also have other requirements in addition to only QoS profiles. For instance, some network services use geocast delivery where data is distributed in limited geographical areas. A typical example is high definition (HD) map dissemination for vehicle-to-anything (V2X) services, where the timely availability of a HD map might enable safer and more comfortable semi- or fully autonomous driving experience. In this case, the HD map is distributed to vehicles or road users in real-time, which is then used for an optimal route selection or to complete critical maneuvers in a safe and comfortable manner. In a typical way to acquire the HD map, an application server gathers all the information from different sources and constructs an HD map. The HD map is divided into sectors or polygons, which are then disseminated to the vehicles in the geographical areas corresponding to the sectors or polygons. The surface of the geographical area depends on the driving environment, such as, for example, highway, urban conditions, or other factors.

Some level of per-packet scheduling with enhanced QoS-related information has been proposed and is beneficial in certain scenarios However, there currently exist certain challenges. For example, per-packet QoS provisioning is not sufficient to enable the expected QoE for certain services, and it also limits the delivery optimization margin for the network by imposing unnecessarily stringent QoS requirements.

SUMMARY

Certain aspects of the present disclosure and their embodiments may provide solutions to these or other challenges. Specifically, various methods and protocols are disclosed for defining an exchange of information between a service a network for the adjustment and optimization of service delivery.

According to certain embodiments, a method by a first function implemented on a first network node for dynamic service negotiation includes transmitting a service description to a second function to enable optimized delivery of a service based on the service description by the second function. The service description comprises information associated with one or more delivery requirements for the service.

According to certain embodiments, a first network node for dynamic service negotiation includes memory operable to store instructions and processing circuitry operable to execute the instructions to cause the first network node to implement a first function to transmit a service description to a second function to enable optimized delivery of a service based on the service description by the second function. The service description comprises information associated with one or more delivery requirements for the service.

According to certain embodiments, a method by a first function implemented by a first network node is provided for dynamic service negotiation. The method includes receiving, from a second function, a service description. The service description comprises information associated with one or more delivery requirements for a service. Delivery of the service is optimized based on the service description received from the second function.

According to certain embodiments, a first network node for dynamic service negotiation includes memory operable to store instructions and processing circuitry operable to execute the instructions to cause the first network node to implement a first function to receive, from a second function, a service description. The service description comprises information associated with one or more delivery requirements for a service. Delivery of the service is optimized based on the service description received from the second function.

Certain embodiments may provide one or more of the following technical advantage(s). As an example, an advantage of certain embodiments may allow a service and a network to exchange information about the requirements of the service and the capabilities of the network in order to guarantee an adequate treatment of the service by the network or an adequate adaptation of the service delivery by the service. According to certain embodiments, service requirements may be extended compared to traditional solutions based on QoS parameters. As another example, an advantage may be that the improved treatment of service by a network is on a per-service rather than a per-packet basis. As still another example, an advantage of certain embodiments may be that the availability of additional service and network information enables more optimization capabilities for the network and also translates into an improved service delivery. As still another example, the guarantee Certain embodiments may include none, some, or all of these advantages. Certain embodiments may include other advantages, as would be understood by a person having ordinary skill in the art.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
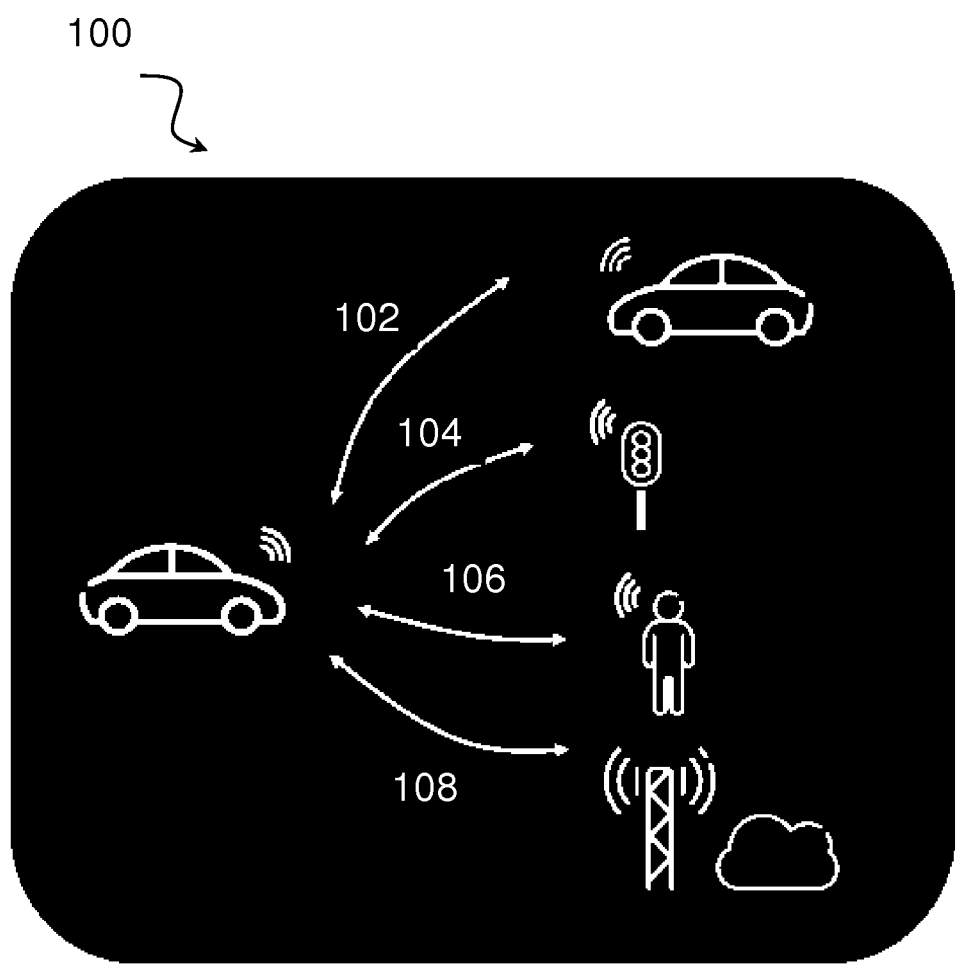
FIG. 1 illustrates some example types of V2X communications services from the application point of view, according to certain embodiments.

Certain embodiments may include functionality for dynamic service negotiation. According to certain embodiments, for example, an exchange of additional and tunable information between a service and a network is defined in order to extend the network knowledge about the service (which is typically limited to Quality of Service (QoS)) and to allow the service to have visibility of some network capabilities. Such information might be used to optimize the treatment of the service within the network (reserve adequate amount of resources, select the most suitable network node to deliver the service, etc.) and the delivery of the service by the service (adapt the behavior of the service according to network capabilities such as e.g. supported QoS in a certain geographical area).

As used herein, the term "Service" refers a set of data to be transferred via a network, associated to one or more applications and with certain specific delivery requirements that need to be fulfilled in order to make the applications successful. An example of service could be a big data file (e.g., a software update) that may or may not be segmented into smaller chunks for efficient delivery. Another example may be a set of independent files that are associated to information relevant to the same service. Another example may consist of real-time streamed data, such as real-time sensor sharing or media delivery.

As used herein, the term "network" refers to a communication infrastructure between two nodes, including cellular networks and sidelink (ad-hoc) communication, as examples.

As used herein, the term "service description" refers to a list of parameters and additional auxiliary information providing information about the delivery requirements for an associated service.

According to certain embodiments, a first function may be implemented on a first network node to provide a service description to a second function, which may be implemented on a second network node. The intention is to enable the second node, which may include as one example a cellular network, to optimize its delivery based on the service description. This is different from traditional QoS negotiation, where service delivery parametrization is typically executed applying per packet QoS criteria rather per service.

In a particular embodiment, the service description may include information about the service, receiver, or the user identity, possibly anonymized by some scrambling or similar technique. As used herein, the term "identity" is intended to refer to any information agreed by both service and network to identify the service, the receiver, or the user. A receiver consists of an equipment connected to the network that might provide connectivity to, for example, a vehicle interested in receiving the service. One or multiple receivers might be indicated in the service description. This is useful to enable the network to associate a network identity to a specific device and/or user and/or service, which are known by the application layer.

In another particular embodiment, the service description may include additional receiver information. Examples of additional receiver information might be the position, or the speed, or the trajectory, etc.

In still another particular embodiment, the service description may include information about the service priority. As used herein, the term "priority" refers to any information agreed by both service and network to be used for managing and differentiating the delivery of multiple services. The priority could be expressed in absolute levels or in relative levels between different services.

In still another particular embodiment, the service description may include additional service data information. Examples of such service data information might be QoS constraints (latency, minimum data rate, maximum data rate, packet loss rate, jitter, etc.). In addition, for real-time streamed data, as one example, additional service data information might also include data burst length and data periodicity. Another example of additional service data information for service coping with, for example, data file delivery might consist of data file size. A further example of additional service data information for delivery of independent files that are associated to information relevant to the same service, for example, might the logical order the files should be delivered to the associated receiver. Another example of additional service data information might consist of maximum cost the service agrees to pay for the delivery of the service or other information associated to the acceptable billing regime.

According to a particular embodiment, the additional service data information might additionally or alternatively include the geographical area of interest related to the data of service, which might be interpreted as either the receiver should receive the service before approaching such area or the receiver should receive the service before leaving the reference area.

According to yet another particular embodiment, the additional service data information may additionally or alternatively include security requirements, ranging from avoiding specific networks (e.g., countries, roaming partners, or ISPs), to more stringent security enforcement (e.g., stronger encryption on RAN-CN interconnect).

It is recognized that service description may be composed of a combination of above examples or other additional information, according to various embodiments.

According to certain embodiments, the second function, typically implemented on the second network node, may provide network information that is relevant to the potential or upcoming or ongoing delivery of a certain service, based also on the service description previously received from the first function.

In a particular embodiment, for example, the network information might indicate whether the QoS requested by the service might be supported by the network, where this information might come from real-time or statistical data analysis or from a network availability and service quality prediction in a given geographical area and time window. Such information might be useful for real-time streamed data, for example, or in general for a service with specific QoS requirements. Such information might also be used to request the service to monitor the experienced QoS for a certain amount of time or for the whole duration of the service.

According to another particular embodiment, the network information might consist of an indication about the time window to deliver the service. This might be useful for services relying on and/or waiting for the delivery of files, for example. Such indication might indicate that the service can start the delivery after the reception of this information or that the service has to wait to receive another information by the network before starting the service delivery or that the service can start the delivery after a certain time window indicated by the network. Furthermore, a time window per file (chunk down- or upload) might be beneficial for most efficiently delivering data to the end user that has deadline but is not latency critical, e.g. HD map section downloads.

According to another particular embodiment, the network information might include the price offered by the network for the service delivery. In certain embodiments, for example, the network information may even include acceptance, refusal, or a counter proposal for the charging proposal by the first node.

According to another particular embodiment, the network information may consist of network capabilities information, such as availability or coverage of some radio (LTE, LTE-A, NR, NB-IoT, LTE-M, etc.) or core/transport (edge cloud, local breakout, etc.) technologies for the indicated target receivers. This might consider feature authorization anchored in the SLA, but also include negotiation of authorizing additional features.

It may be recognized that the network information may be composed of a combination of above examples or other additional information. Network information might be generated in different ways, for example using statistical information about the network behavior or performance or coverage or using real-time network or user information or using approaches such as machine learning or additional information or tools to predict the behavior of the network or the user.

The protocol described above enables both the application and the network nodes to negotiate the delivery parametrization and scheduling of a service, according to certain embodiments. Such rich information allows the network to optimize the delivery, by providing additional information that is relevant in a longer or wider perspective compared to a single packet. Examples of optimization for the network might include route or path selection, delivery strategy (unicast, multicast, etc.), selection of access nodes or technologies to handle the service delivery, traffic prioritization, load balancing, capacity maximization, etc., according to various particular embodiments. The intention is to enable the network to optimize not only the packet delivery based on the specified QoS parameters (as it is done in traditional QoS enforcement), but to also incorporate live information, as well as dynamic requirements, into the QoS planning and negotiation, while at the same time having an ongoing interaction with the service provider about served QoS and/or service delivery status. Similarly, the protocol enables the application to adjust its data transfer and scheduling strategy based on the capabilities of the network, according to certain embodiments. It may be recognized that the protocol described above might be used before the service delivery starts to negotiate the delivery parametrization or it might also be used during the service delivery to adapt the delivery parametrization.

Particular embodiments are described in FIGS. 1-13 of the drawings, like numerals being used for like and corresponding parts of the various drawings. FIG. 1 illustrates some example types of V2X communications services 100 from the application point of view. One such type of communication includes vehicle-to-vehicle (V2V) communication 102. V2V communication 102 includes any communication between vehicles using V2V applications and is predominantly broadcast-based. V2V communication 102 may be realized by either direct communication between the devices in the respective vehicles, or via infrastructure such as a cellular network. An example of V2V communication 102 is the transmission of a cooperative awareness message (CAM) with vehicle status information (such as position, direction and speed) transmitted to other vehicles in the proximity repeatedly (every 100 ms to 1 s). Another example is the transmission of a decentralized environmental notification message (DENM), which is an event-triggered message to alert vehicles. These two examples are taken from the ETSI Intelligent Transport Systems (ITS) specification of V2X applications, which also specifies the conditions under which the messages are generated. A main characteristic of V2V applications is the tight requirements on latency that can vary from 20 ms (for pre-crash warning messages) to 100 ms for other road safety services.

Another type of V2X communication is vehicle-to-infrastructure (V2I) communication 104. V2I communication 104 includes any communication between vehicles and a Roadside Unit (RSU). The RSU is a stationary transportation infrastructure entity which communicates with vehicles in its proximity. An example of V2I communication 104 is transmission of speed notifications from the RSU to vehicles, as well as queue information, collision risk alerts, curve speed warnings. Due to the safety related nature of V2I communication 104, delay requirements are similar to V2V requirements.

Yet another type of V2X communication is vehicle-to-pedestrian (V2P) communication 106. V2P communication 106 includes any communication between vehicles and vulnerable road users, such as pedestrians, using V2P applications. V2P communication 106 typically takes place between distinct vehicles and pedestrians either directly or via infrastructure such as cellular network.

Still another type of V2X communication is vehicle-to-network (V2N) communication 108. V2N communication 108 includes any communication between a vehicle and a centralized application server (or an ITS Traffic Management Center) both using V2N applications, via infrastructure (such as a cellular network). One example is a bad road condition warning sent to all vehicles in a wide area, or traffic flow optimization in which V2N application suggests speeds to vehicles and coordinates traffic lights. Therefore, V2N messages are supposed to be controlled by a centralized entity (i.e. the Traffic Management Center) and provisioned to vehicles in a large geographical area, rather than in a small area. Additionally, unlike V2V/V2I, latency requirements are more relaxed in V2N because it is meant to be used for non-safety purposes, e.g. is latency requirement is typically considered.

Figure 2:
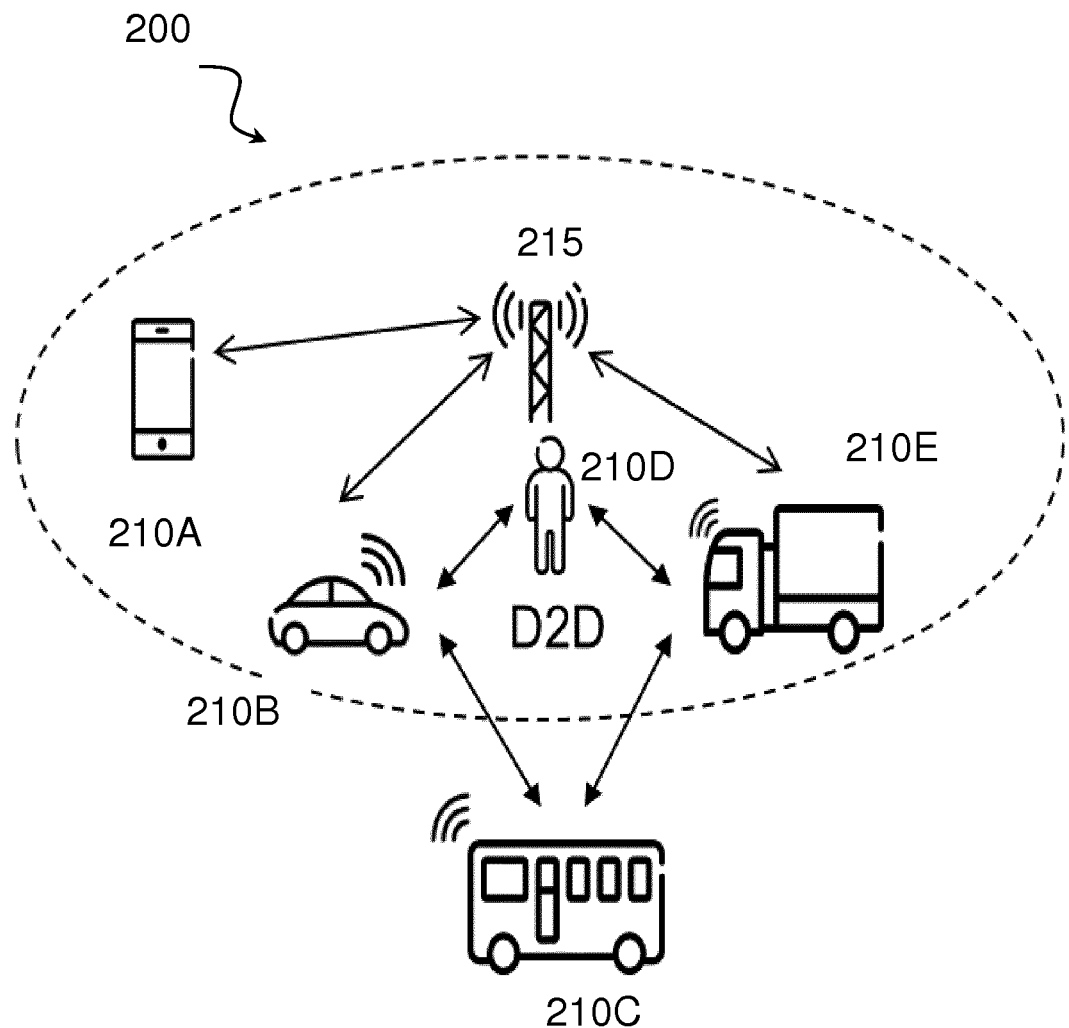
FIG. 2 illustrates an example network for dynamic service negotiation, according to certain embodiments.

FIG. 2 is a block diagram illustrating an embodiment of a network 200, in accordance with certain embodiments. Network 200 includes one or more wireless device(s) 210 (which may be interchangeably referred to as user equipment (UEs) 210) and network node(s) 215 (which may be interchangeably referred to as eNodeBs (eNBs) 215). More particularly, wireless device 210A is a smart phone, wireless devices 210B-D are vehicle wireless devices (i.e., a wireless device installed or otherwise integrated into a vehicle), and wireless device 210E is a pedestrian having a wireless device 210, such as, for example, a smart phone. Wireless devices 210 may communicate with network nodes 215, or with one or more other wireless devices 210 over a wireless interface. For example, wireless device 210A, 210B, 210C, and 210D may transmit wireless signals to network node 215 and/or receive wireless signals from network node 215. Wireless devices 210 may also transmit wireless signals to other wireless devices 210 and/or receive wireless signals from other wireless devices 210. For example, wireless devices 210B, 210C, 210D, and 210E may communicate using D2D communication, PC5 communication, and/or DSRC communication. The wireless signals may contain voice traffic, data traffic, control signals, and/or any other suitable information. In some embodiments, an area of wireless signal coverage associated with a network node 215 may be referred to as a cell.

In certain embodiments, network node 215 may interface with a radio network controller. The radio network controller may control network node 215 and may provide certain radio resource management functions, mobility management functions, and/or other suitable functions. In certain embodiments, the functions of the radio network controller may be included in network node 215. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node (not depicted) may manage the establishment of communication sessions and various other functionalities for wireless device 210. Wireless device 210 may exchange certain signals with the core network node using the non-access stratum layer. In non-access stratum signaling, signals between wireless device 210 and the core network node may be transparently passed through the radio access network. In certain embodiments, network node 215 may interface with one or more network nodes over an internode interface.

Example embodiments of network 200 may include one or more wireless devices 210, and one or more different types of network nodes capable of communicating (directly or indirectly) with wireless devices 210. In some embodiments, wireless devices may be referred to as user equipment (UE), vehicle wireless device, and/or vehicle UE. The terms, UE, wireless device, vehicle UE, and vehicle wireless device are to be considered non-limiting terms that can be any type of wireless device capable of communicating with network nodes 215 or another wireless device 210 over radio signals. Wireless device 210 may also be a radio communication device, target device, D2D UE, machine-type-communication UE or UE capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), etc. Wireless device 210 may operate under either normal coverage or enhanced coverage with respect to its serving cell. The enhanced coverage may be interchangeably referred to as extended coverage. Wireless device 210 may also operate in a plurality of coverage levels (e.g., normal coverage, enhanced coverage level 1, enhanced coverage level 2, enhanced coverage level 3 and so on). In some cases, wireless device 210 may operate in an out-of-coverage scenario.

Also, in some embodiments, generic terminology, "network node" is used. It can be any kind of network node, which may comprise a road-side unit (RSU), a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME etc.), O&M, OSS, SON, positioning node (e.g., E-SMLC), MDT, or any suitable network node.

The terminology such as network node and wireless device should be considered non-limiting and does in particular not imply a certain hierarchical relation between the two; in general, "eNodeB" could be considered as device 1 and "UE" device 2, and these two devices communicate with each other over some radio channel.

Although FIG. 2 illustrates a particular arrangement of network 200, the present disclosure contemplates that the various embodiments described herein may be applied to a variety of networks having any suitable configuration. For example, network 200 may include any suitable number of wireless devices 210 and network nodes 215, as well as any additional elements suitable to support communication between wireless devices or between a wireless device and another communication device (such as a landline telephone). Any one of network node 215, wireless device 210, a network node in the core, a radio node, a scheduler, a device, or other type of network node may comprise a distribution node for performing the techniques for dynamic service negotiation as described herein. Example embodiments of wireless device 210, network node 215, and other network and/or distribution nodes (such as radio network controller or core network node) are described in more detail below with respect to FIGS. 7, 8, and 9, respectively.

Furthermore, although certain embodiments may be described as implemented in a 5G NR network, the embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data). For example, the various embodiments described herein may be applicable to LTE, LTE evolution, LTE-Advanced, UMTS, HSPA, GSM, cdma2000, WiMax, WiFi, another suitable radio access technology, or any suitable combination of one or more radio access technologies, including 5G standards. Although certain embodiments may be described in the context of V2X applications, the various embodiments may be advantageously applied to other applications. Furthermore, although certain embodiments may be described in the context of wireless transmissions in the downlink, the present disclosure contemplates that the various embodiments are equally applicable in the uplink.

As described above, V2X communication may include any combination of direct communication between vehicles, pedestrians, and infrastructure. FIG. 2 illustrates a variety of V2X scenarios in which the various embodiments of the present disclosure may be applied. As an example of vehicle-to-infrastructure (V2I) communication 104, wireless device 210A, 210B, and 210D may communicate wirelessly with network node 215. As an example of vehicle-to-pedestrian (V2P) communication 106, wireless devices 210B and 210D may communicate with a pedestrian having a wireless device 210E. As an example of vehicle-to-vehicle (V2V) communication 102, wireless devices 210B, 210C, and 210D may communicate wirelessly with each other.

Figure 3:
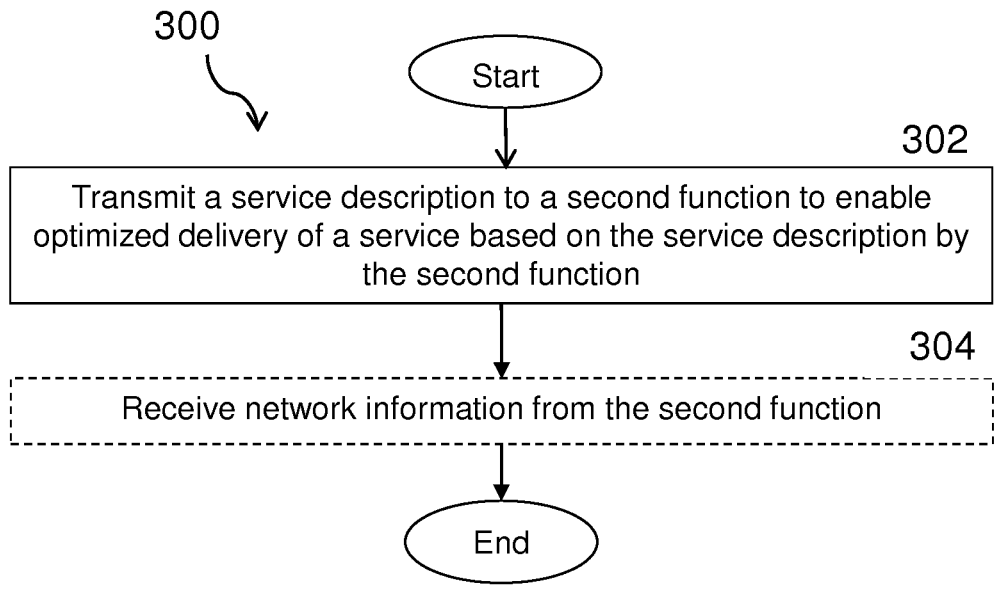
FIG. 3 an example method by a first function implemented by a first network node for dynamic service negotiation, according to certain embodiments.

FIG. 3 illustrates an example method 300 by a first function implemented by a first network node 215 for dynamic service negotiation, according to certain embodiments. The method begins at step 302 when the first function implemented by the first network node 215 transmits a service description to a second function to enable optimized delivery of a service based on the service description by the second function. According to certain embodiments, the one or more delivery requirements for the service are on a per-service rather than a per-packet basis. According to a particular embodiment, the second function is implemented by a second network node.

According to certain embodiments, the service description comprises information associated with one or more delivery requirements for the service. For example, in a particular embodiment, the service description includes identity information which identifies at least one of the service, a receiver of the service, or a user. Additionally or alternatively, in particular embodiments, the service description information may include any one or combination of the following:
  information related to at least one of a position, a speed, and a trajectory of a receiver of the service;
  information identifying a service priority;
  one or more QoS constraints;
  data burst length;
  data periodicity;
  data file delivery;
  data file size;
  an order in which a plurality of files should be delivered to a receiver;
  a maximum cost the service agrees to pay for the delivery of the service;
  billing information;
  information associated with a geographical area of interest related to data associated with the service; and/or
  information associated with at least one security requirement.

Optionally, at step 304, the first network node 215 may receive network information from the second function. The network information may be associated with a delivery of the service according to the service description previously transmitted by the first network node to the second function. According to various particular embodiments, the network information may include any one or combination of:
  an indication of whether a QoS requested by the service is supported;
  an indication identifying a time or time window to deliver the service;
  an indication of a price offered for delivery of the service; and
  an indication of one or more network capabilities.

Certain embodiments may comprise more or fewer actions, and the actions may be performed in any suitable order.

Figure 4:
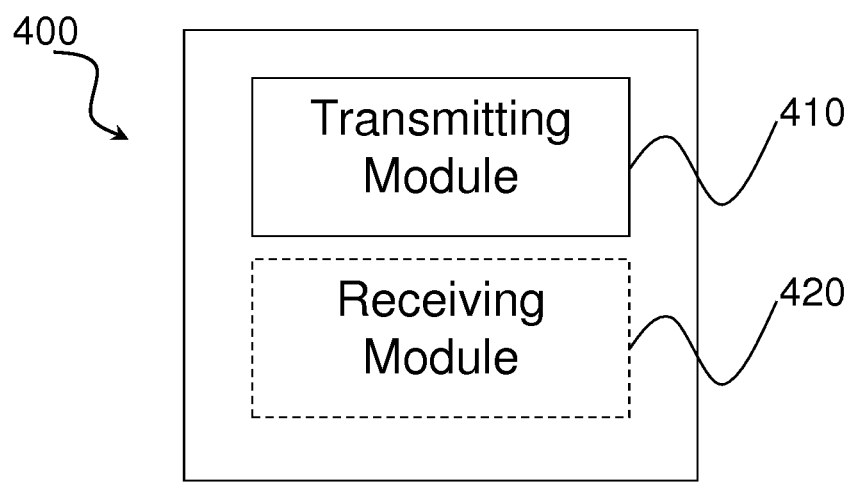
FIG. 4 illustrates an example virtual computing device for dynamic service negotiation, according to certain embodiments.

In certain embodiments, the method for dynamic service negotiation may be performed by a virtual computing device. FIG. 4 illustrates an example virtual computing device 400 for dynamic service negotiation, according to certain embodiments. In certain embodiments, virtual computing device 400 may include modules for performing steps similar to those described above with regard to the method illustrated and described in FIG. 3. For example, virtual computing device 400 may include a transmitting module 410 and any other suitable modules for dynamic service negotiation. Optionally, virtual computing device 400 may additionally include a receiving module 420. In some embodiments, one or more of the modules may be implemented using processing circuitry such as that described below with regard to FIG. 7, 8, or 9. In certain embodiments, the functions of two or more of the various modules may be combined into a single module.

The transmitting module 410 may perform certain of the transmitting functions of virtual computing device 400. For example, in a particular embodiment, transmitting module 410 may transmit a service description to a second function to enable optimized delivery of a service based on the service description by the second function.

The optional receiving module 420 may perform certain of the receiving functions of virtual computing device 400. For example, in a particular embodiment, receiving module 420 may receive network information from the second function. The network information may be associated with a delivery of the service according to the service description previously transmitted by the first network node to the second function.

Other embodiments of virtual computing device 400 may include additional components beyond those shown in FIG. 4 that may be responsible for providing certain aspects of the network node's functionality, including any of the functionality described above and/or any additional functionality (including any functionality necessary to support the solutions described above). The various different types of the distribution node may include components having the same physical hardware but configured (e.g., via programming) to support different radio access technologies, or may represent partly or entirely different physical components.

Figure 5:
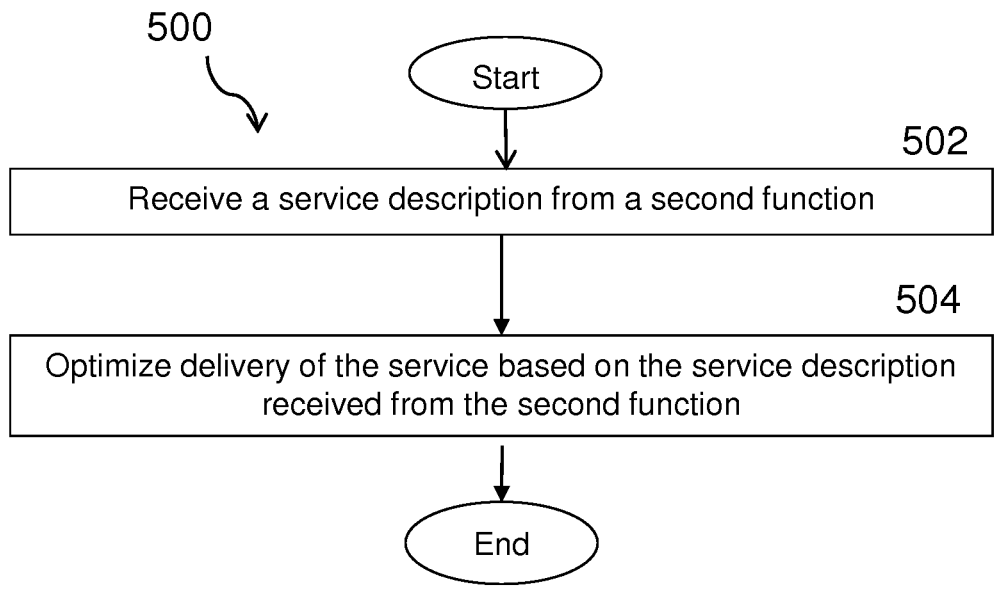
FIG. 5 illustrates an example method by a first function implemented by a first network node for dynamic service negotiation, according to certain embodiments.

FIG. 5 illustrates an example method 500 by a first function implemented by a first network node 215 for dynamic service negotiation, according to certain embodiments. The method begins at step 502 when the first function implemented by the first network node 215 receives a service description from a second function. The service description includes information associated with one or more delivery requirements for a service. According to certain embodiments, the one or more delivery requirements for the service are on a per-service rather than a per-packet basis. According to a particular embodiment, the second function is implemented by a second network node.

According to certain embodiments, the service description comprises information associated with one or more delivery requirements for the service. For example, in a particular embodiment, the service description includes identity information which identifies at least one of the service, a receiver of the service, or a user. Additionally or alternatively, in particular embodiments, the service description information may include any one or combination of the following:

information related to at least one of a position, a speed, and a trajectory of a receiver of the service;
information identifying a service priority;
one or more QoS constraints;
data burst length;
data periodicity;
data file delivery;
data file size;
an order in which a plurality of files should be delivered to a receiver;
a maximum cost the service agrees to pay for the delivery of the service;
billing information;
information associated with a geographical area of interest related to data associated with the service; and/or
information associated with at least one security requirement.

At step 504, the first network node 215 optimizes delivery of the service based on the service description received from the second function.

Optionally, the first network node 215 may transmit network information from the second function. The network information may be associated with a delivery of the service according to the service description previously transmitted by the first network node to the second function. According to various particular embodiments, the network information may include any one or combination of:

an indication of whether a QoS requested by the service is supported;
an indication identifying a time or time window to deliver the service;
an indication of a price offered for delivery of the service; and
an indication of one or more network capabilities.

Certain embodiments may comprise more or fewer actions, and the actions may be performed in any suitable order.

Figure 6:
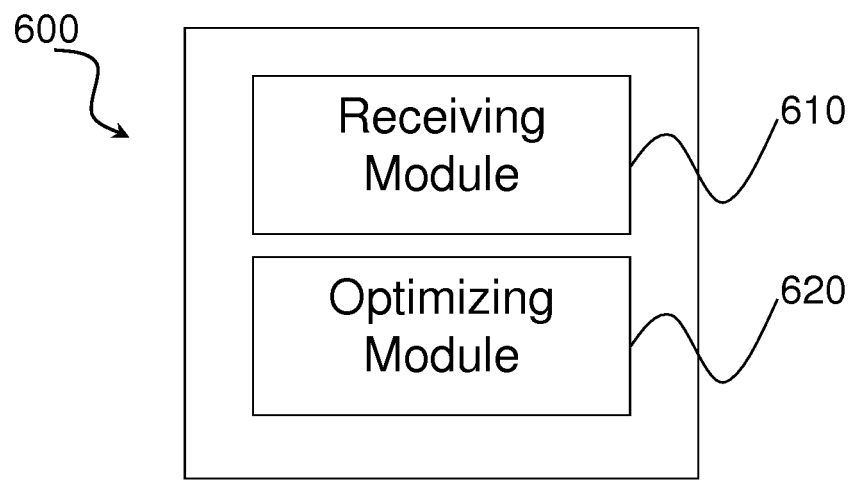
FIG. 6 illustrates an example virtual computing device for dynamic service negotiation, according to certain embodiments.

In certain embodiments, the method for dynamic service negotiation may be performed by a virtual computing device. FIG. 6 illustrates an example virtual computing device 600 for dynamic service negotiation, according to certain embodiments. In certain embodiments, virtual computing device 600 may include modules for performing steps similar to those described above with regard to the method illustrated and described in FIG. 5. For example, virtual computing device 600 may include a receiving module 610, an optimizing module 620, and any other suitable modules for dynamic service negotiation.

In some embodiments, one or more of the modules may be implemented using processing circuitry such as that described below with regard to FIG. 7, 8, or 9. In certain embodiments, the functions of two or more of the various modules may be combined into a single module.

The receiving module 610 may perform certain of the receiving functions of virtual computing device 600. For example, in a particular embodiment, receiving module 610 may receive a service description to a second function.

The optimizing module 620 may perform certain of the optimizing functions of virtual computing device 600. For example, in a particular embodiment, optimizing module 620 may optimize delivery of a service based on the service description received from the second function.

Other embodiments of virtual computing device 600 may include additional components beyond those shown in FIG. 6 that may be responsible for providing certain aspects of the network node's functionality, including any of the functionality described above and/or any additional functionality (including any functionality necessary to support the solutions described above). The various different types of the distribution node may include components having the same physical hardware but configured (e.g., via programming) to support different radio access technologies, or may represent partly or entirely different physical components.

Figure 7:
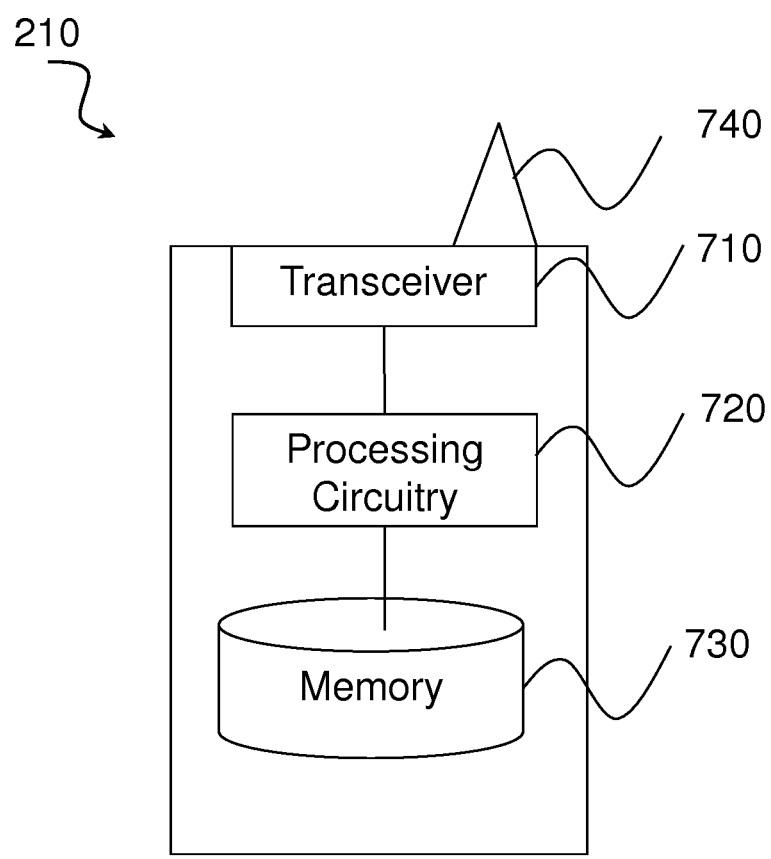
FIG. 7 illustrates an exemplary wireless device for dynamic service negotiation, in accordance with certain embodiments.

FIG. 7 is a block schematic of an exemplary wireless device 210 for dynamic service negotiation, in accordance with certain embodiments. Wireless device 210 may refer to any type of wireless device communicating with a node and/or with another wireless device in a cellular or mobile communication system. Examples of wireless device 210 include a mobile phone, a smart phone, a PDA (Personal Digital Assistant), a portable computer (e.g., laptop, tablet), a sensor, a modem, an MTC device/machine-to-machine (M2M) device, laptop embedded equipment (LEE), laptop mounted equipment (LME), USB dongles, a D2D capable device, or another device that can provide wireless communication. A wireless device 210 may also be referred to as UE, a station (STA), a device, or a terminal in some embodiments. Wireless device 210 includes transceiver 710, processing circuitry 720, memory 730, an antenna 740. In some embodiments, transceiver 710 facilitates transmitting wireless signals to and receiving wireless signals from network node 215 (e.g., via antenna 740), processing circuitry 720 (e.g., which may include one or more processors) executes instructions to provide some or all of the functionality described above as being provided by wireless device 210, and memory 730 stores the instructions executed by processing circuitry 720.

Processing circuitry 720 may include any suitable combination of hardware and software implemented in one or more modules to execute instructions and manipulate data to perform some or all of the described functions of wireless device 210, such as the functions of UE 210 (i.e., wireless device 210) described herein. In some embodiments, processing circuitry 720 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 720.

Other embodiments of wireless device 210 may optionally include additional components beyond those shown in FIG. 7 that may be responsible for providing certain aspects of the wireless device's functionality, including any of the functionality described above and/or any additional functionality (including any functionality necessary to support the solution described above). As just one example, wireless device 210 may include input devices and circuits, output devices, and one or more synchronization units or circuits, which may be part of the processing circuitry 720. Input devices include mechanisms for entry of data into wireless device 210. For example, input devices may include input mechanisms, such as a microphone, input elements, a display, etc. Output devices may include mechanisms for outputting data in audio, video, and/or hard copy format. For example, output devices may include a speaker, a display, etc.

Figure 8:
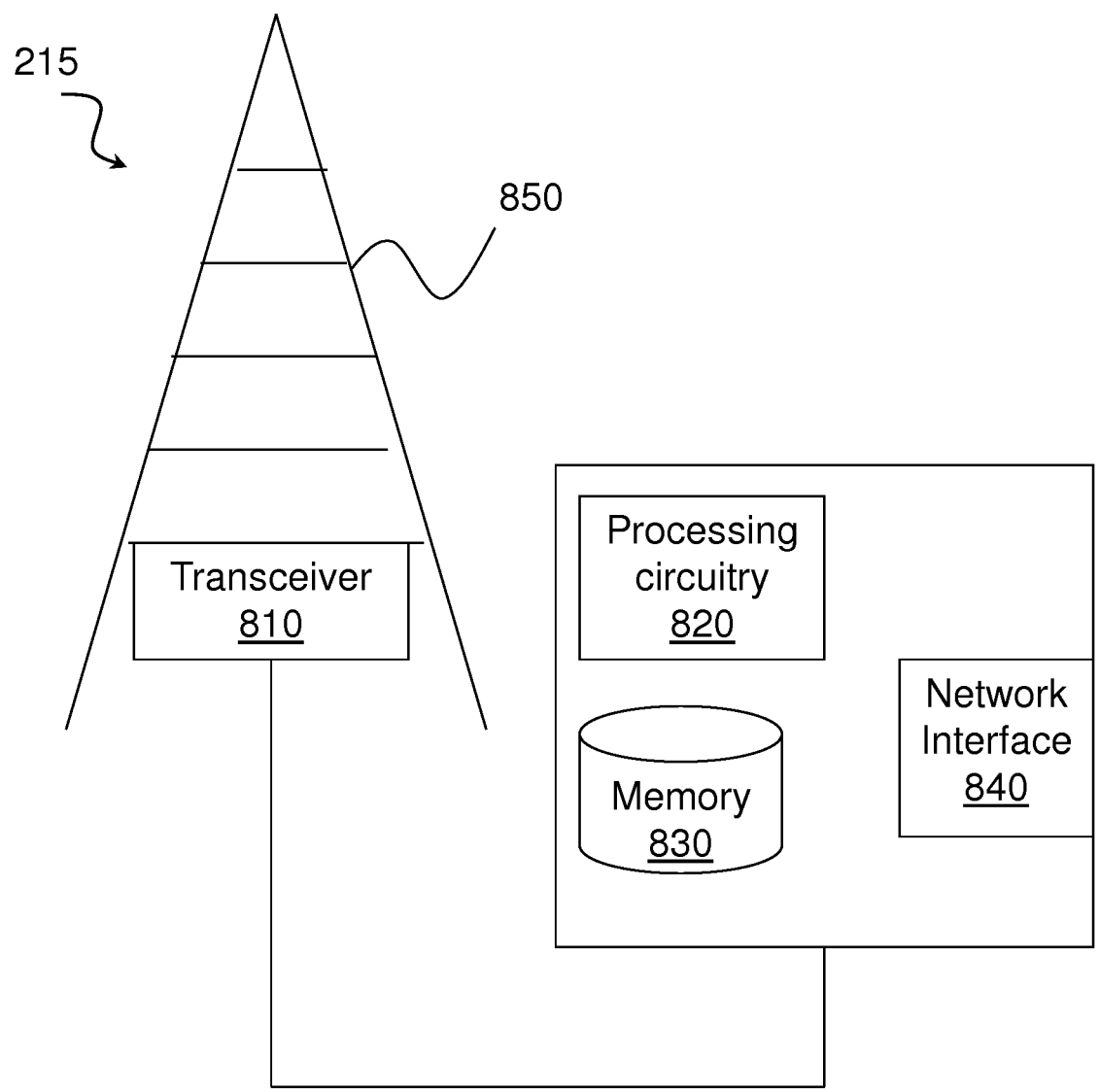
FIG. 8 illustrates an example network node for dynamic service negotiation, according to certain embodiments.

FIG. 8 illustrates an example network node 215 for dynamic service negotiation, in accordance with certain embodiments. Network node 215 may be any type of radio network node or any network node that communicates with a UE and/or with another network node. Examples of network node 215 include an gNB, eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 215 may be deployed throughout network 200 as a homogenous deployment, heterogeneous deployment, or mixed deployment. A homogenous deployment may generally describe a deployment made up of the same (or similar) type of network nodes 215 and/or similar coverage and cell sizes and inter-site distances. A heterogeneous deployment may generally describe deployments using a variety of types of network nodes 215 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 215 may include one or more of transceiver 810, processing circuitry 820 (e.g., which may include one or more processors), memory 830, and network interface 840. In some embodiments, transceiver 810 facilitates transmitting wireless signals to and receiving wireless signals from wireless device 210 (e.g., via antenna 850), processing circuitry 820 executes instructions to provide some or all of the functionality described above as being provided by a network node 215, memory 830 stores the instructions executed by processing circuitry 820, and network interface 840 communicates signals to backend network components, such as a gateway, switch, router, Internet, Public Switched Telephone Network (PSTN), core network nodes or radio network controllers, etc.

Processing circuitry 820 may include any suitable combination of hardware and software implemented in one or more modules to execute instructions and manipulate data to perform some or all of the described functions of network node 215, such as those described herein. In some embodiments, processing circuitry 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processing circuitry 820 and may refer to any suitable device operable to receive input for network node 215, send output from network node 215, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of network node 215 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
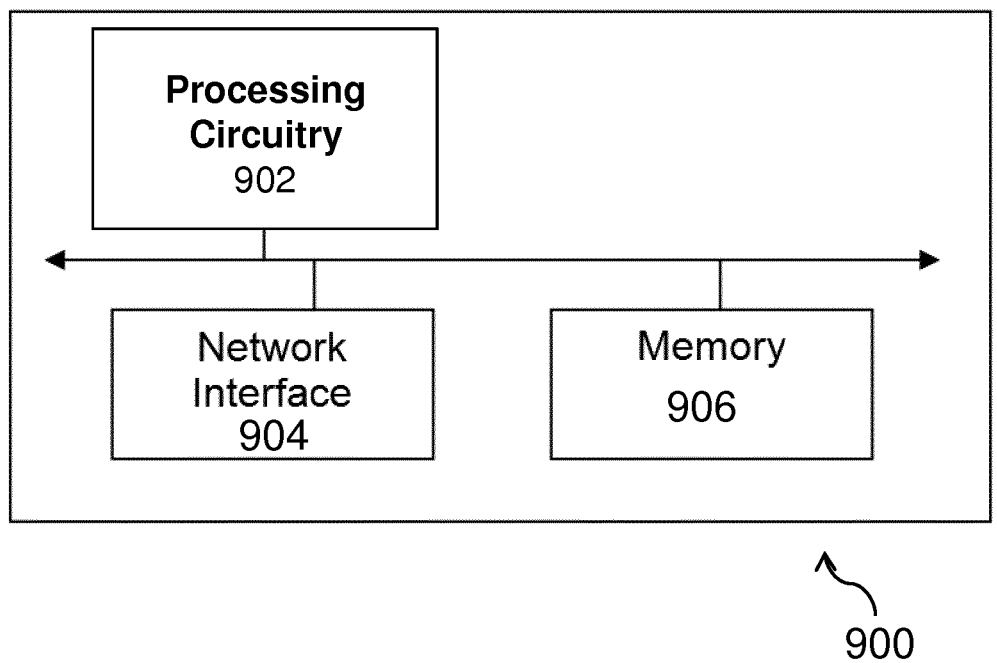
FIG. 9 illustrates an example radio network controller or core network node, according to certain embodiments.

FIG. 9 illustrates an example radio network controller or core network node 900, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node includes processing circuitry 902 (e.g., which may include one or more processors), network interface 904, and memory 906. In some embodiments, processing circuitry 902 executes instructions to provide some or all of the functionality described above as being provided by the network node, memory 906 stores the instructions executed by processing circuitry 902, and network interface 904 communicates signals to any suitable node, such as a gateway, switch, router, Internet, Public Switched Telephone Network (PSTN), network nodes 215, radio network controllers or core network nodes, etc.

Processing circuitry 902 may include any suitable combination of hardware and software implemented in one or more modules to execute instructions and manipulate data to perform some or all of the described functions of the radio network controller or core network node. In some embodiments, processing circuitry 902 may include, for example, one or more computers, one or more central processing units (CPUs), one or more microprocessors, one or more applications, and/or other logic.

Memory 906 is generally operable to store instructions, such as a computer program, software, an application including one or more of logic, rules, algorithms, code, tables, etc. and/or other instructions capable of being executed by a processor. Examples of memory 606 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 904 is communicatively coupled to processing circuitry 902 and may refer to any suitable device operable to receive input for the network node, send output from the network node, perform suitable processing of the input or output or both, communicate to other devices, or any combination of the preceding. Network interface 904 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Figure 10:
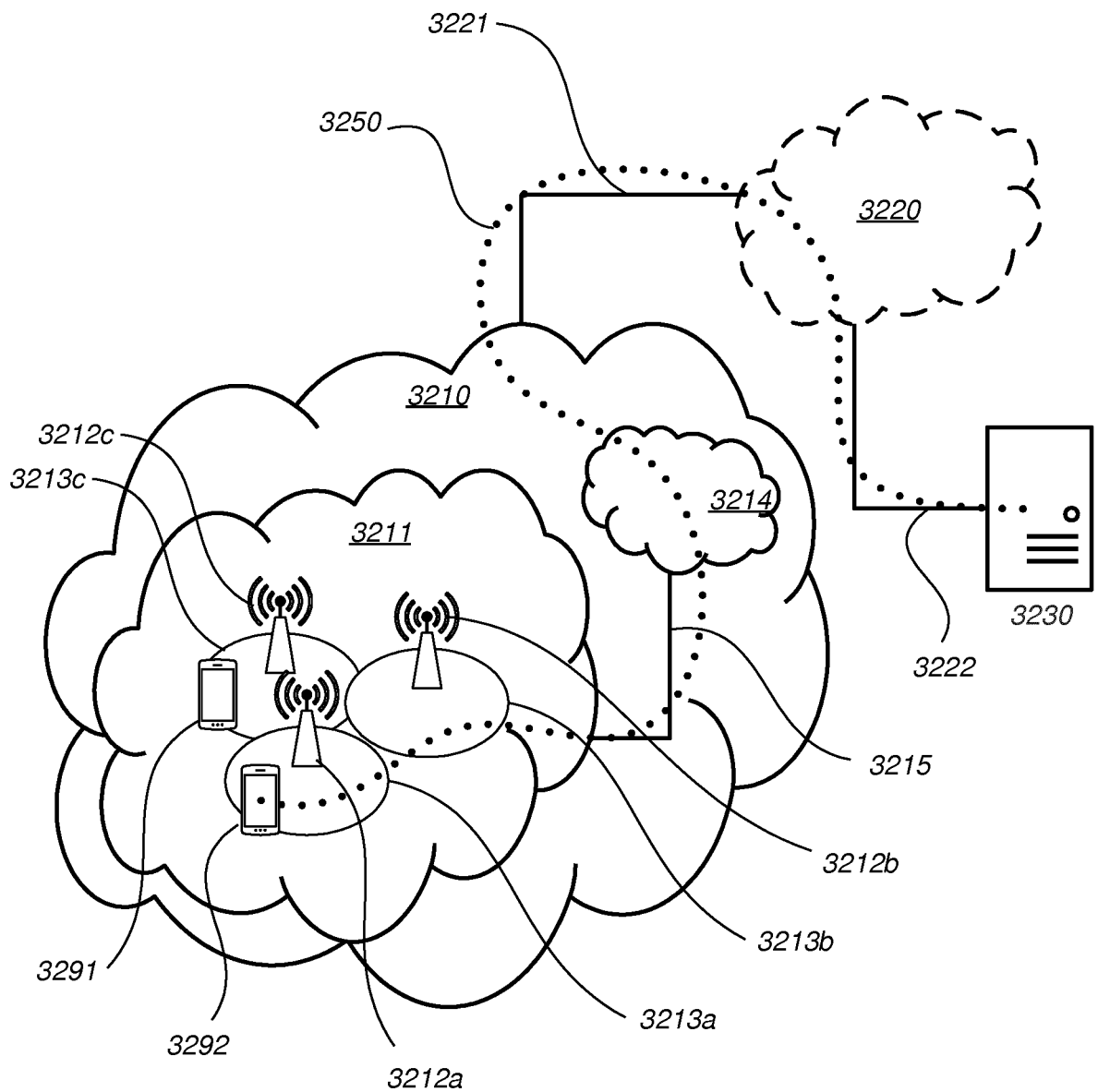
FIG. 10 illustrates a telecommunication network connected via an intermediate network to a host computer, according to certain embodiments.

FIG. 10 schematically illustrates a telecommunication network connected via an intermediate network to a host computer, according to certain embodiments. In accordance with an embodiment, a communication system includes a telecommunication network 3310, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3310 is itself connected to a host computer 3340, which may be embodied in the hardware and/or software of a standalone server, a cloud-implemented server, a distributed server or as processing resources in a server farm. The host computer 3340 may be under the ownership or control of a service provider or may be operated by the service provider or on behalf of the service provider. The connections 3221, 3222 between the telecommunication network 3310 and the host computer 3340 may extend directly from the core network 3214 to the host computer 3340 or may go via an optional intermediate network 3320. The intermediate network 3320 may be one of, or a combination of more than one of, a public, private or hosted network; the intermediate network 3320, if any, may be a backbone network or the Internet; in particular, the intermediate network 3320 may comprise two or more sub-networks (not shown).

The communication system of FIG. 10 as a whole enables connectivity between one of the connected UEs 3291, 3292 and the host computer 3340. The connectivity may be described as an over-the-top (OTT) connection 3250. The host computer 3340 and the connected UEs 3291, 3292 are configured to communicate data and/or signaling via the OTT connection 3250, using the access network 3211, the core network 3214, any intermediate network 3320 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3340 to be forwarded (e.g., handed over) to a connected UE 3291. Similarly, the base station 3212 need not be aware of the future routing of an outgoing uplink communication originating from the UE 3291 towards the host computer 3340.

Figure 11:
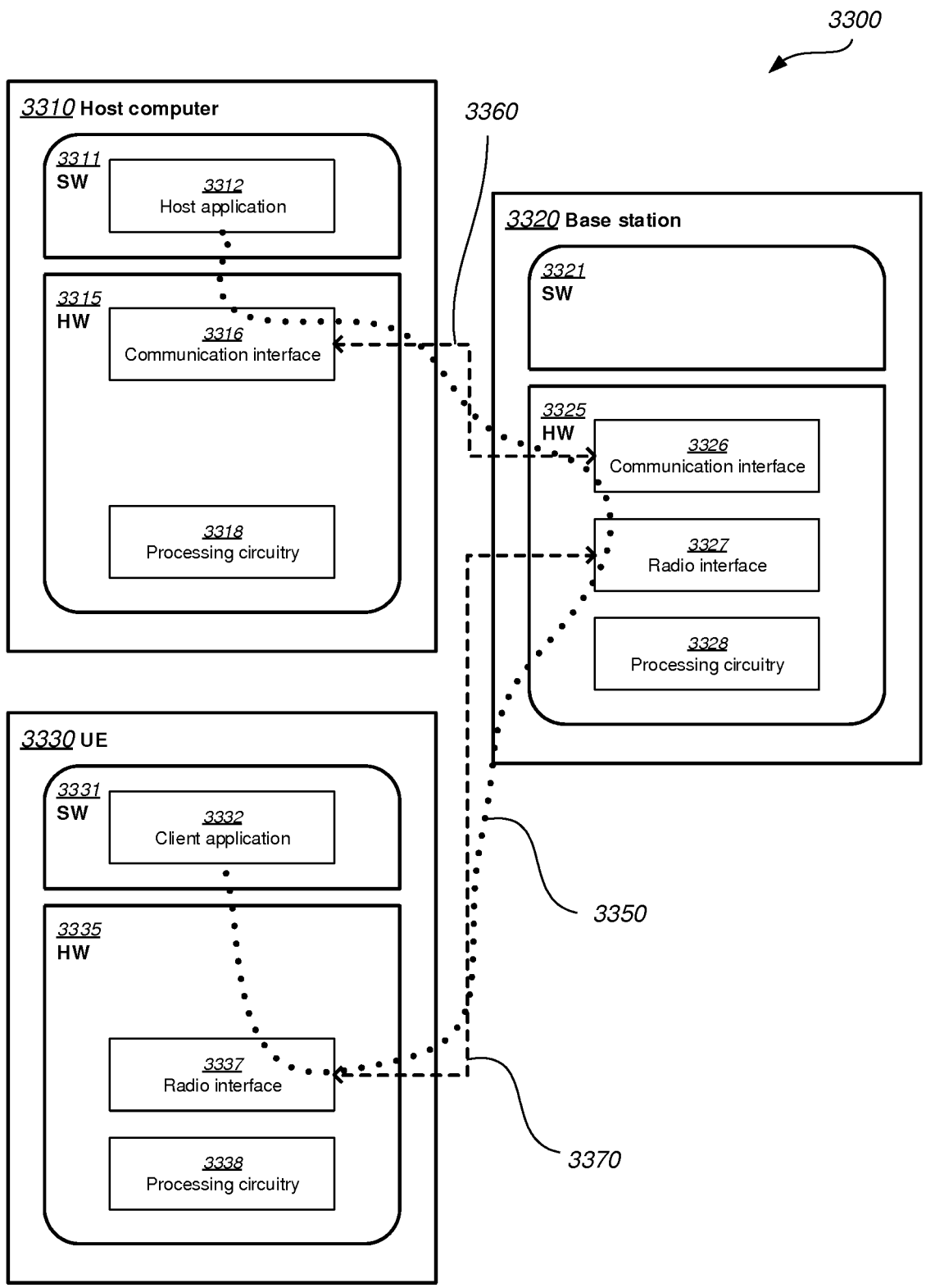
FIG. 11 illustrates a generalized block diagram of a host computer communicating via a base station with a user equipment over a partially wireless connection, according to certain embodiments.

FIG. 11 is a generalized block diagram of a host computer communicating via a base station with a user equipment over a partially wireless connection, according to certain embodiments. Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 11 may be identical to the host computer 3340, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate and/or latency and thereby provide benefits such as reduced user waiting time, relaxed restriction on file size, and/or better responsiveness.

A measurement procedure may be provided for the purpose of monitoring data rate and/or latency, and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 12:
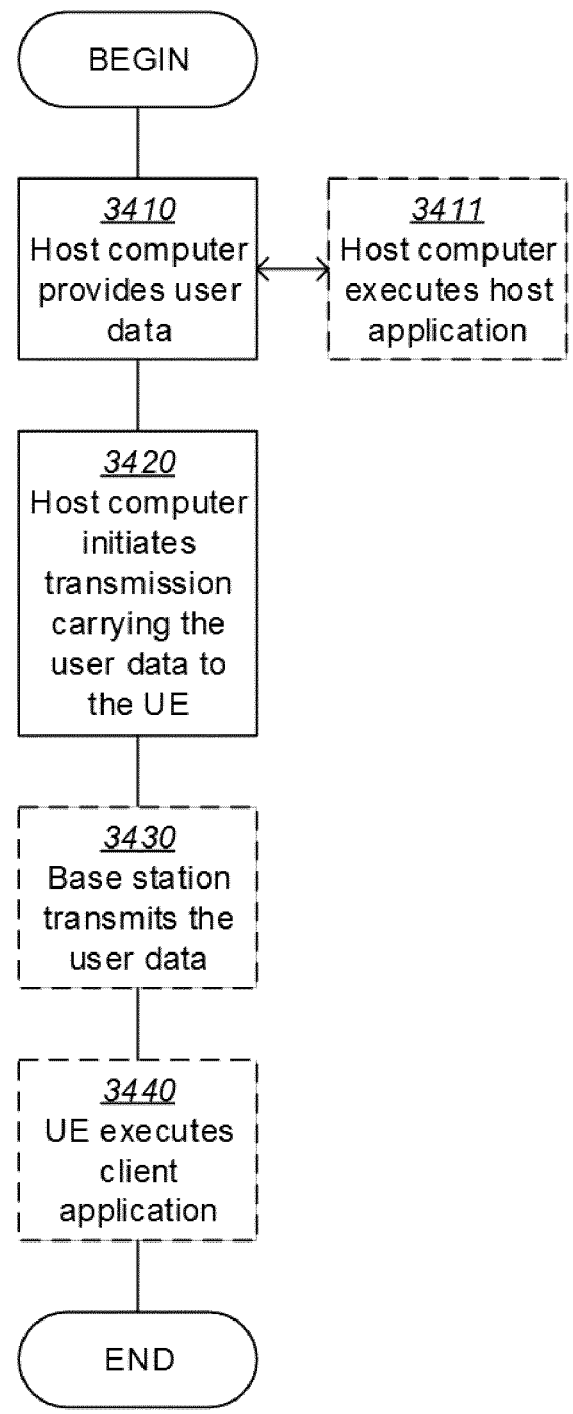
FIG. 12 illustrates a method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 13:
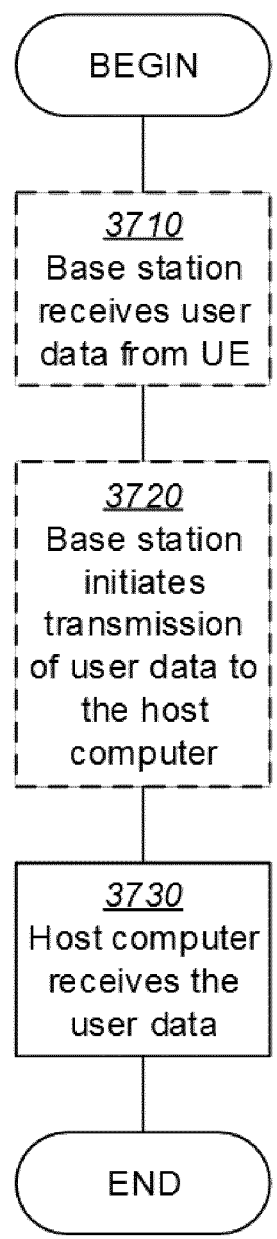
FIG. 13 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

Abbreviations used in the preceding description include:
5G Fifth Generation
CN Core Network
FTP File Transfer Protocol
HD High Definition
IoT Internet of Things
ISP Internet Service Provider
KPI Key Performance Indicator
LTE Long Term Evolution
LTE-A LTE-Advanced
LTE-M LTE for Machines
NB-IoT NarrowBand-IoT
NR New Radio
QoS Quality of Service
RAN Radio Access Network
SLA Service Level Agreement
URLLC Ultra-Reliable Low Latency Communications
V2X Vehicular-to-Everything
VoIP Voice over IP

The invention claimed is:

1. A method by a first function implemented on a first network node for dynamic service negotiation comprises:
   transmitting a service description to a second function to enable optimized delivery of a service based on the service description by the second function; and
   the service description comprising information associated with one or more delivery requirements for the service, the service description comprising information related to a trajectory of a receiver of the service and information associated with one or more Quality of Service (QoS) constraints, the second function being implemented on a second network node; and
   receiving, from the second function, network information associated with a delivery of the service according to the service description previously transmitted by the first network node to the second function, the network information comprising an indication of one or more network capabilities.

2. The method of claim 1, wherein the one or more delivery requirements for the service are on a per-service rather than a per-packet basis.

3. The method of claim 1, wherein the service description comprises identity information which identifies at least one of the service, a receiver of the service, or a user.

4. The method of claim 1, wherein the service description comprises information related to at least one of a position and a speed of a receiver of the service.

5. The method of claim 1, wherein the service description comprises information identifying a service priority.

6. A first network node for dynamic service negotiation, the first network node comprising:
   memory configured to store instructions; and
   processing circuitry configured to execute the instructions to cause the first network node to implement a first function to transmit a service description to a second function to enable optimized delivery of a service based on the service description by the second function; and
   the service description comprises information associated with one or more delivery requirements for the service, the service description comprising information related to a trajectory of a receiver of the service and information associated with one or more Quality of Service (QoS) constraints, the second function being implemented on a second network node, the processing circuitry being further configured to receive, from the second network function, network information associated with a delivery of the service according to the service description previously transmitted by the first network node to the second function, the network information comprising an indication of one or more network capabilities.

7. The first network node of claim 6, wherein the one or more delivery requirements for the service are on a per-service rather than a per-packet basis.

8. The first network node of claim 6, wherein the service description comprises identity information which identifies at least one of the service, a receiver of the service, or a user.

9. The first network node of claim 6, wherein the service description comprises information related to at least one of a position and a speed of a receiver of the service.

10. The first network node of claim 6, wherein the service description comprises information identifying a service priority.

11. A method by a first function implemented on a first network node for dynamic service negotiation, the method comprising:
   receiving, from a second function, a service description, the service description comprising information associated with one or more delivery requirements for a service;
   optimizing delivery of the service based on the service description received from the second function, the service description comprising information related to a trajectory of a receiver of the service and information associated with one or more Quality of Service (QoS) constraints, the second function being implemented on a second network node; and
   transmitting, to the second network function, network information associated with a delivery of the service according to the service description previously received from the second network function, the network information comprising an indication of one or more network capabilities.

12. The method of claim 11, wherein the one or more delivery requirements for the service are on a per-service rather than a per-packet basis.

13. The method of claim 11, wherein the service description comprises identity information which identifies at least one of the service, a receiver of the service, or a user.

14. The method of claim 11, wherein the service description comprises information related to at least one of a position and a speed of a receiver of the service.

15. The method of claim 11, wherein the service description comprises information identifying a service priority.

16. A first network node for dynamic service negotiation, the first network node comprising:
   memory configured to store instructions; and
   processing circuitry configured to execute the instructions to cause the first network node to implement a first function to:

receive, from a second function, a service description, the service description comprising information associated with one or more delivery requirements for a service; and optimize delivery of the service based on the service description received from the second function, the service description comprising information related to a trajectory of a receiver of the service and information associated with one or more Quality of Service (QoS) constraints, the second function being implemented on a second network node, the processing circuitry being further configured to transmit, to the second network function, network information associated with a delivery of the service according to the service description previously received from the second network function, the network information comprising an indication of one or more network capabilities.

17. The first network node of claim 16, wherein the one or more delivery requirements for the service are on a per-service rather than a per-packet basis.

18. The first network node of claim 16, wherein the service description comprises identity information which identifies at least one of the service, a receiver of the service, or a user.

19. The first network node of claim 16, wherein the service description comprises information related to at least one of a position and a speed of a receiver of the service.

20. The first network node of claim 16, wherein the service description comprises information identifying a service priority.

* * * * *